(12) United States Patent
Sinha et al.

(10) Patent No.: US 12,260,394 B2
(45) Date of Patent: Mar. 25, 2025

(54) METHOD AND SYSTEM TO CONTROL PAYMENT TRANSACTIONS IN A PAYMENT CARD USING COMPANION PAYMENT APPLICATION

(71) Applicant: MASTERCARD INTERNATIONAL INCORPORATED, Purchase, NY (US)

(72) Inventors: Ajay Sinha, Pune (IN); Naveen Kumar Gupta, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 270 days.

(21) Appl. No.: 17/340,775

(22) Filed: Jun. 7, 2021

(65) Prior Publication Data

US 2021/0383360 A1  Dec. 9, 2021

(30) Foreign Application Priority Data

Jun. 8, 2020  (IN) .............................. 202041023932

(51) Int. Cl.
  *G06Q 20/34*  (2012.01)
  *G06Q 20/20*  (2012.01)
  *G06Q 20/32*  (2012.01)
  *G06Q 20/40*  (2012.01)

(52) U.S. Cl.
  CPC .......... *G06Q 20/353* (2013.01); *G06Q 20/20* (2013.01); *G06Q 20/3265* (2020.05); *G06Q 20/3433* (2013.01); *G06Q 20/40975* (2013.01)

(58) Field of Classification Search
  None
  See application file for complete search history.

(56) References Cited

U.S. PATENT DOCUMENTS

| | | | |
|---|---|---|---|
| 9,454,754 B2 * | 9/2016 | Head .................... | G06Q 20/36 |
| 10,147,077 B2 * | 12/2018 | Mestré .............. | G06Q 20/4037 |
| 2013/0185167 A1 * | 7/2013 | Mestre .............. | G06Q 20/4033 |
| | | | 705/21 |
| 2021/0264404 A1 * | 8/2021 | Aabye ................. | G06Q 20/401 |

* cited by examiner

*Primary Examiner* — David P Sharvin
(74) *Attorney, Agent, or Firm* — Talem IP Law, LLP

(57) ABSTRACT

Embodiments provide methods and systems for controlling payment transactions in a payment card using a companion payment application installed on a user device. The payment application and the payment card may be provided by an issuer server. Using the payment application, the number of transactions allowed on the payment card or an amount limit is set for the payment card. The payment application is used to set, reset, change the value of a counter in the card, which determines the number of allowed transactions. When the user attempts to make a transaction at a POS terminal, the payment card reads the value of counter, and if the value is not equal to a threshold value, the payment card exchanges data with the POS terminal and updates the value of the counter. The payment card is precluded from transaction when value of the counter is equal to threshold value.

17 Claims, 10 Drawing Sheets

METHOD AND SYSTEM TO CONTROL PAYMENT TRANSACTIONS IN A PAYMENT CARD USING COMPANION PAYMENT APPLICATION

TECHNICAL FIELD

The present disclosure relates to a contactless payment card that may be controlled using an application and, more particularly to, methods and systems for controlling payment transactions of a payment card using a companion payment application installed on a remote device.

BACKGROUND

In recent times, there has been a considerable technological growth in payment technology, security of payment transactions and the way payment cards are being used and managed. The payment interchange networks and issuers are looking forward to coming up with payment cards that can be used to make payment transactions easy and effortless for the user. EMV cards, smart cards, contactless cards are developed for hassle-free payment methods. While contactless cards enable the user to just dip the payment card on a Point of Sale (POS) terminal to complete a payment without any authentication step, the security of contactless payment cards is at stake. Fraudsters may utilize cards to make a plurality of payments without the need of any user authentication.

Though it is not recommended to handover the payment card to anyone, at times people will have to provide their cards to the shopkeeper or old age cardholders may have to hand over their cards to others to make payment for them. In such situations, the payment card may be misused and fraud may occur. Though the contactless cards are made to be user-friendly, there exists no room for the user to control the functionalities of a card and stay away from fraudsters.

In light of the above, there exists a need to allow the users to control some of the functionalities of their contactless cards which makes their cards more secure and easy to use. Especially, there exists a need to provide a technical solution for users to control one or more functionalities of their payment cards using the electronic devices they own such as a smartphone, with minimal interference of the issuer of the cards.

BRIEF SUMMARY

Various embodiments of the present disclosure provide systems, methods, electronic devices and computer program products for controlling payment transactions in a payment card using a companion payment application.

In an embodiment, a method for controlling payment transactions in a payment card is disclosed. The method includes establishing, by a processor of the payment card, a communication with a payment application installed on a user device. The method includes receiving, by the processor, a command signal from the user device via the payment application. The command signal includes a user identifier in an encrypted form and a code to set a value of a counter stored in the payment card. The method further includes verifying, by the processor, the validity of the user identifier in the encrypted form by matching with a stored user identifier in the payment card. Upon verification, the method includes executing, by the processor, the code to set the value of the counter. Further, the method includes updating, by the processor, a current value of the counter by a pre-defined value each time the payment card is successfully used to make a payment transaction for obtaining an updated value of the counter; The method includes precluding, by the processor, the payment card to be used for payment transaction when the updated value of the counter is equal to a threshold value.

In another embodiment, a payment card for performing a payment transaction is disclosed. The payment card includes a communication interface configured to establish a communication with a payment application installed on a user device. The payment card includes a memory and a processor. The memory includes stored instructions. The processor is configured to execute the stored instructions to cause the payment card to perform at least in part to receive a command signal from the user device via the payment application. The command signal includes a user identifier in an encrypted form and a code to set a value of a counter stored in the payment card. The payment card is further caused to verify the validity of the user identifier in the encrypted form by matching with a stored user identifier in the payment card. Upon verification, the payment card is caused to execute the code to set the value of the counter. Further, the payment card is caused to update a current value of the counter by a pre-defined value each time the payment card is successfully used to make a payment transaction for obtaining an updated value of the counter. The payment card is then caused to preclude the payment card to be used for payment transaction when the updated value of the counter is equal to a threshold value.

BRIEF DESCRIPTION OF THE DRAWINGS

For a more complete understanding of example embodiments of the present technology, reference is now made to the following descriptions taken in connection with the accompanying drawings in which.

Figure 1:
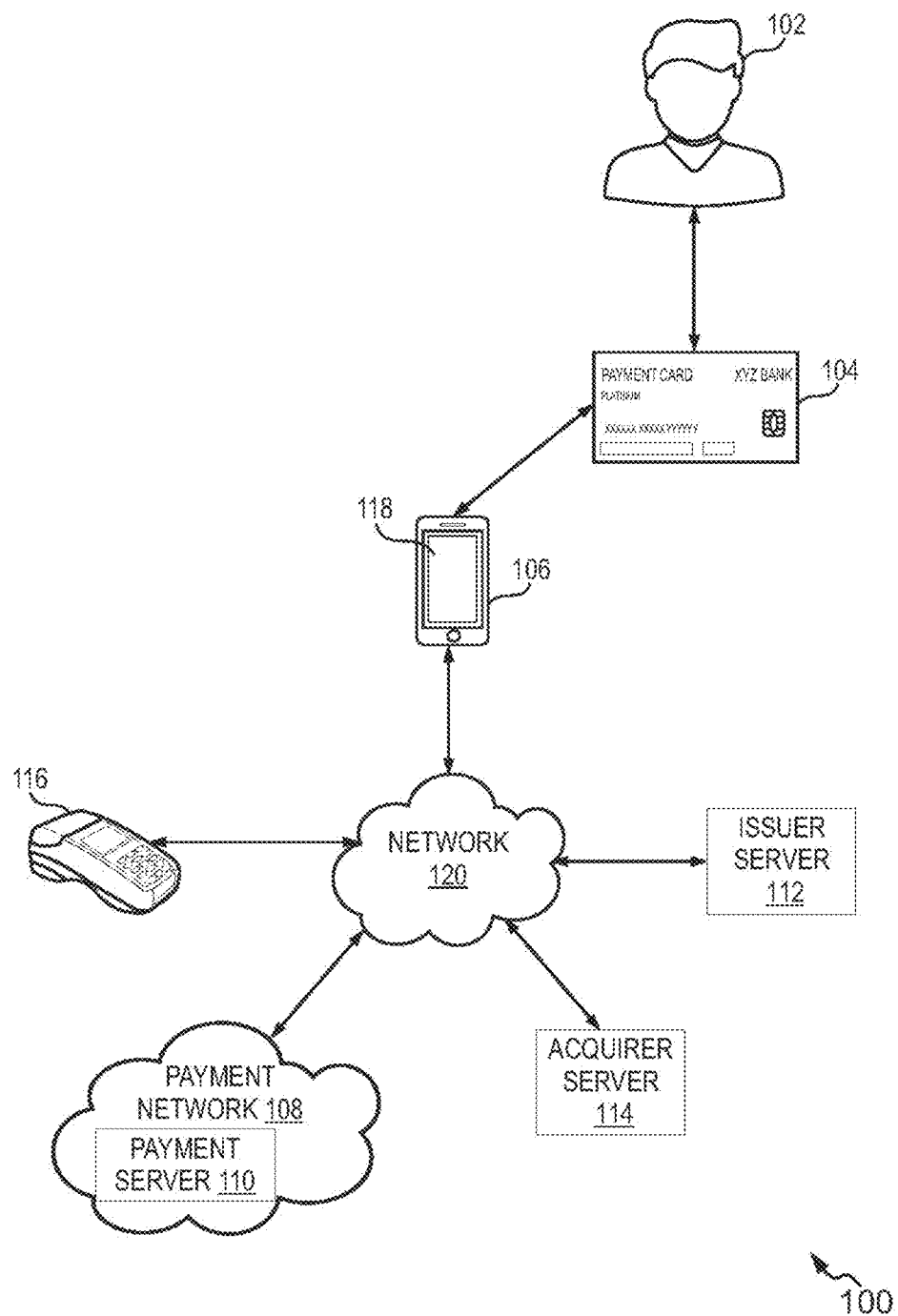
FIG. 1 illustrates an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer", used throughout the description, refers to a financial institution normally called as an "issuer bank" or "issuing bank" in which an individual or an institution may have an account. The issuer also issues a payment card, such as a credit card or a debit card, etc. Further, the issuer may also facilitate online banking services such as electronic money transfer, bill payment, etc., to the account holders through a server system called as "issuer server" throughout the description. Further, the term "acquirer" is an organization that transmits a purchase transaction to a payment card system for routing to the issuer of the payment card account in question. Typically, the acquirer has an agreement with merchants, wherein the acquirer receives authorization requests for purchase transactions from the merchants, and routes the authorization requests to the issuers of the payment cards being used for the purchase transactions. The terms "acquirer", "acquiring bank", "acquiring bank" or "acquirer bank" will be used interchangeably herein. Further, one or more server systems associated with the acquirer are referred to as "acquirer server" to carry out its functions.

The term "payment network", used throughout the description, refers to a network or collection of systems used for the transfer of funds through the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by Mastercard®, VISA®, Discover®, American Express®, etc.

The term "payment transaction terminal" used throughout the description, refers to point of sale (POS) terminals, computers or data processing devices for processing payment at merchant locations, payment gateways and/or merchant online interface for allowing customers, cardholders, or account holders to make offline and/or online purchases. The payment transaction terminal may be construed as any virtual or physical electronic system that accepts the cardholder's payment transaction requests, and forwards such requests to any of the entities such as acquirer server, payment interchange servers (e.g., payment server) and/or issuer server for the purposes of carrying out the payment transaction.

Overview

Various example embodiments of the present disclosure provide methods, systems, user devices, and computer program products for facilitating a payment application for controlling payment transactions in a payment card such as a contactless payment card.

In various example embodiments, the present disclosure facilitates a payment card equipped with a near field communication (NFC) component capable of establishing a communication with another NFC enabled device such as a smartphone or a Point of Sale (POS) terminal. The payment card is further equipped with a chip such as an EMV chip including a processor, file system and security domain, etc. The components present in the EMV chip enable the card to facilitate the controlling of the payment transactions in the payment card with the help of a companion payment application installed on an NFC enabled user device such as a smartphone, laptop, etc. The payment application installed on the user device may be provided by an issuer of the payment card associated with the user or may be provided by any other third parties associated with banking and/or card issuance. The payment application includes executable programs which when executed, causes the user device to perform a plurality of operations.

In an embodiment, the user may be enrolled on the payment application installed on the user device. The enrollment may require the user to provide a user identifier (ID) which will be given by the issuer of the payment card. The issuer of the payment card may also have stored the same identifier, hereinafter addressed as a unique ID. The unique ID will be stored in a file system of the payment card. Once the user has registered, the user ID will be stored in the user device with the payment application installed on it. The user can only utilize that user device to control the payment transactions in the payment card.

Controlling the payment transactions in the payment card may include limiting the number of transactions allowed on the payment card, setting a limit on the maximum amount that can be transacted using the payment card and the like. In an embodiment, the number of transactions allowed on the payment card may be limited by storing a value of a counter on the payment card and the maximum amount limit may be set by storing a value of an amount limit on the payment card. The user may set, reset or change the value of the counter and/or set a value of the amount limit on the payment card using the payment application installed on the user device.

In an embodiment, the payment card may be personalized by the issuer of the payment card or a third-party. Card personalization refers to inputting a plurality of codes and permissions on the EMV chip of the payment card that enables the payment card to perform operations related to one or more embodiments described in the present disclosure. An issuer server may be associated with the issuer bank of the payment card and may be configured to personalize each and every card before it is issued for usage by users. In the embodiment, the EMV chip of the payment card is equipped with a processor, a communication interface and a file system. The processor may include an application module and a security module. The application module may facilitate the processing of payment transactions. The security module is configured to authenticate the authenticity of the issuer for controlling payment transactions of the payment card. The file system is configured to store data required by the processor to process the payment transactions.

In an embodiment, the issuer server may personalize the payment card before issuance by installing the application on the EMV chip, and providing a security module and file system access to the application. The payment card is further personalized with the unique ID and a security key stored in the file system. The security key is used to authenticate the issuer when the user tries to change the value of the counter on the payment card. Further, the user's name and card number and other required things may be embossed on the payment card during the personalization. After personalization, the payment card may be issued to the user associated with the unique ID stored on the payment card.

In one embodiment, when the user wants to set the value of the counter to a desired number, wherein the value of the counter on the card may limit the number of allowed transactions on the payment card, the user may open the payment application installed on the user device and tap the payment card on the user device. The payment card and the user device are both enabled with NFC component. Further, the payment card may establish a communication with the user device installed with the payment application provided by the issuer of the payment card. After the establishment of the communication, the user may be provided with an interface on the payment application facilitating the user to choose an option to set, reset, or change a counter on the payment card. The counter is configured to control the number of payment transactions allowed by the payment card. The counter may be set to a desired number, by the user, by selecting an option on the interface.

In another embodiment, a value of the amount limit may be stored on the payment card instead of the value of the counter or in addition to the value of the counter. The value of the amount limit may be aligned with the EMV chip specifications. The value of the amount limit may be configured to limit the maximum amount that can be used by the payment card for performing transactions. For example, if the value of amount limit is set to be $2,000 US dollars, the payment card can be utilized to make transactions that add up to $2,000 US dollars or a single transaction of $2,000 US dollars.

For example, if the user chooses to set the value of the counter to +3 in order to allow three transactions by the payment card until changed or set again to a different value, the user may enter the value+3 and submit it on the payment application. The payment application at this point, causes the user device to send the user ID stored on the payment application and the option selected by the user to the issuer server. In the example, the payment application may cause the user device to send the user ID associated with the user and a request to set the counter to +3 to the issuer server associated with the issuer of the payment card.

In one embodiment, the issuer server, after receiving the user ID and a request to set, reset or change the value of the counter on the payment card from the payment application installed on the user device, is configured to send a command signal to the payment application. The command signal may include an encrypted user ID and a code which when executed by the processor of the payment card, causes the setting, resetting or changing of the value of the counter on the payment card. The payment application may further cause the user device to transmit the command signal received from the issuer server to the payment card. In the example, the issuer server may send a command signal including the user ID in an encrypted form and a code to set the value of the counter to +3. The payment application may further cause the user device to transmit the command signal to the payment card.

In an alternate embodiment, payment application installed on the user device may only receive the user ID in the encrypted form from the issuer server. The payment application itself may be configured to generate a code to set, reset or change the value of the counter or set the value of the amount limit. The payment application may further generate a command signal including the encrypted user ID and the code and send the command signal to the payment card.

In one embodiment, the payment card may decrypt the encrypted user ID and match it with the unique ID associated with the user, stored in the payment card during the personalization of the payment card. If the decrypted user identifier (ID) and the unique ID stored in the payment card match, the validity of the user ID is verified and the payment card is configured to execute the code present in the command signal. The code, if executed, causes the processor of the payment card to set, reset or change the value of the counter on the payment card. In the example, the payment card may match the user ID and the unique ID and if the user ID is found valid, and the code to set the value of the counter to +3 is executed. The value of the counter may be set to +3 and stored in the file system of the payment card.

Further in an embodiment, when the user wants to make a payment at a POS terminal, the user may present the payment card at the POS terminal. The POS terminal may determine the application on the payment card to proceed with the payment transaction. After, the application is determined by the POS terminal, the processor of the payment card may further check for the value of the counter stored in the file system of the payment card. Only if the value of the counter is not equal to a threshold value of the counter, the payment card allows any possible payment transaction. Once the counter is read and the payment is processed, the payment card is configured to update the value of the counter. The value of the counter may be decremented by 1 each time the counter is read. Otherwise, if the value of the counter is equal to the threshold value, the payment card is precluded to proceed with the payment transaction.

In an example, the POS terminal may select the application on the payment card required for processing the payment transaction, wherein the application is installed on the payment card during personalization process. The application on the card may read/retrieve a current value of the counter stored in the file system which is +3 and proceed with the payment with the POS terminal. The payment card may further update the current value of the counter to +2 by decrementing the current value to obtain an updated value of the counter. The payment card may send an application cryptogram to the POS terminal for further processing. After the POS receives the application cryptogram, the payment transaction may be carried out in the business as usual (BAU) format known in the art based on which the payment transaction goes through an acquirer, payment network and issuer, and then payment is completed.

Various example embodiments of the present disclosure are described hereinafter with reference to FIGS. 1 to 9.

FIG. 1 illustrates an exemplary representation of an environment 100 related to at least some example embodiments of the present disclosure. In the illustrated embodiment, a user 102 is shown with a payment card 104 and a user device 106. Examples of the payment card 104 may include any credit card, smart card, debit card, or any type of contactless cards equipped with NFC component capable of communicating with external devices such as smartphone, POS, etc. The user device 106 is shown to be installed with a payment application 118. The payment application 118 may be provided by an issuer server 112 or a third-party server associated with an institution responsible for the issuance of the payment card 104. The payment application 118 may be utilized by the user to control various functionalities of the payment card 104.

The user 102 is shown to be using the payment application 118 on his user device 106. The user device 106 may be any electronic device such as, but not limited to, a personal computer (PC), a tablet device, a Personal Digital Assistant (PDA), a voice-activated assistant, a Virtual Reality (VR) device, a smartphone, and a laptop. For illustration purposes, the user device 106 is shown to be a smartphone. The payment application 118 typically requires authentication/authorization of the user 102 in order to control the functionalities of the payment card 104. For example, using a UI facilitated by an issuer server 112 or a third-party server, the user 102 is enabled to enter a username, a password, a PIN or a fingerprint to authenticate his/her identity. Further, during enrollment, the payment application 118 requires the user 102 to provide sensitive information such as personal information, contact information, financial information and the like. The payment application 118 may include at least one payment card such as payment card 104 in electronic form therein, where the payment card 104 is issued by an issuer (e.g., on an issuer server 112) which may correspond to a bank, a credit agency, or other types of financial institution.

The issuer server 112 is further configured to personalize the payment card 104 before issuing it to the user 102. Herein, term 'personalization' refers to personalizing payment cards such as the payment card 104 with the required information and permissions for facilitating payment transactions using the payment card 104. The details exclusive to the users such as the user 102 are also stored in the card during the personalization process. An application configured to process payment transactions is installed on the payment card 104, and permissions are provided to the application to access the security module and file system of the payment card 104. Further, a unique ID associated with the user 102 is stored in the file system of the payment card 104, wherein the unique ID is same as the user ID given by the issuer to the user 102. A security key is stored in the file system of the payment card that is used to decrypt the user ID in the encrypted form received by the issuer server 112. Additionally, card number, user name, expiry date and other information related to the card are also embossed or printed on the payment card 104.

In an alternate embodiment, a third-party server may personalize the payment card 104 in the same manner as explained above.

The payment application 118 includes actionable buttons such as but not limited to 'set counter', 'reset counter', 'change counter', and 'set amount limit'. The user 102 may click on any one of the actionable buttons to initiate controlling any one of the functionalities of the payment card 104 using the payment application 118. The user device 106 can be a feature phone with limited functionalities or a smartphone with internet connectivity. In other embodiments, the user device 106 can be any electronic device capable of utilizing various communication technologies such as Unstructured Supplementary Service Data (USSD) technology, SMS technology, Wi-Fi, mobile network data, etc.

In an example, the user 102 initiates setting a value of the counter by selecting 'set counter' icon on the interface displayed by the payment application 118. The payment application 118 receives the selection information and transmits a request signal to the issuer server 112 to send an encrypted user ID. The user ID will be stored in the payment application 118 during an enrollment process. Only enrolled/registered users can utilize the service of controlling payment transactions in the payment card 104. The payment application 118 may send the user ID along with a request signal for an encrypted user ID to the issuer server 112. The issuer server 112 may further send the user ID in an encrypted form along with the code to set the value of the counter to a desired value selected by the user 102 on the payment application 118. The encrypted user ID and the code to set the value of the counter are incorporated as a command and a command signal is sent to the payment application on the user device.

The payment application may further transmit the command signal to the payment card 104. The payment card may then decrypt the encrypted user ID using the security key stored in the payment card 104 and then match the decrypted user ID and a unique ID stored in the file system of the payment card 104. Upon successful match, the payment card may execute the code included in the command signal sent by the issuer server 112. In the example, the code includes executable program to set the value of the counter to a desired value entered by the user 102. The value of the counter is set to the desired value and is stored on the file system of the payment card 104.

Further, when the user 102 wants to make a payment transaction using the payment card 104, the user 102 may provide the card to a merchant who may dip it into a POS terminal 116. The POS terminal 116 is equipped with NFC capability and may communicate with the payment card 104. The payment card 104 may determine the application needed to process the payment transaction and determine the value of the counter. If the value of the counter is not equal to a threshold value, the payment card 104 proceeds with the payment by exchanging data with the POS terminal using an application protocol data unit (APDU). The transaction is not processed otherwise. In an embodiment, if the value of the counter is equal to the threshold value, the payment card 104 does not exchange any data via APDU with the POS terminal 116, and communication stops between the payment card 104 and the POS terminal 116 thereby stopping any transaction.

In an alternate embodiment, if the value of the amount limit is set on the payment card and is not reached yet, the payment card 104 proceeds with the transaction, else the transaction is not processed.

The user device 106, POS terminal 116, the issuer server 112, the acquirer server 114 and the payment server 110 communicate with one another using a network 120. The network 120 may be a centralized network or may include a plurality of sub-networks that may offer a direct communication or may offer indirect communication. Examples of the network 120 may include any type of wired network, wireless network, or a combination of wired and wireless networks. A wireless network may be a wireless local area network ("WLAN"), a wireless wide area network ("WWAN"), or any other type of wireless network now known or later developed. Additionally, the network 120 may be or include the Internet, intranets, extranets, microwave networks, satellite communications, cellular systems, personal communication services ("PCS"), infrared communications, global area networks, or other suitable networks, etc., or any combination of two or more such networks.

To accept payment from the user 102, the merchant associated with the POS terminal 116 must normally establish an account with a financial institution that is part of the financial payment system. This financial institution is usually called the "merchant bank" or the "acquiring bank" or "acquirer bank" or simply "acquirer". The acquirer server 114 is associated with the acquirer bank. The acquirer server 114 is also configured to register the merchant associated with the POS terminal 116 to accept a payment transaction from the user 102 using a payment card 104.

In one embodiment, a payment server 110 associated with a payment network 108 is shown. The payment network 108 may be used by the payment cards issuing authorities as a payment interchange network. Examples of payment interchange networks include, but not limited to, Mastercard® payment system interchange network. The Mastercard® payment system interchange network is a proprietary communications standard promulgated by Mastercard International Incorporated® for the exchange of financial transaction data between financial institutions that are members of Mastercard International Incorporated®. (Mastercard is a registered trademark of Mastercard International Incorporated located in Purchase, N.Y.).

Figure 2:
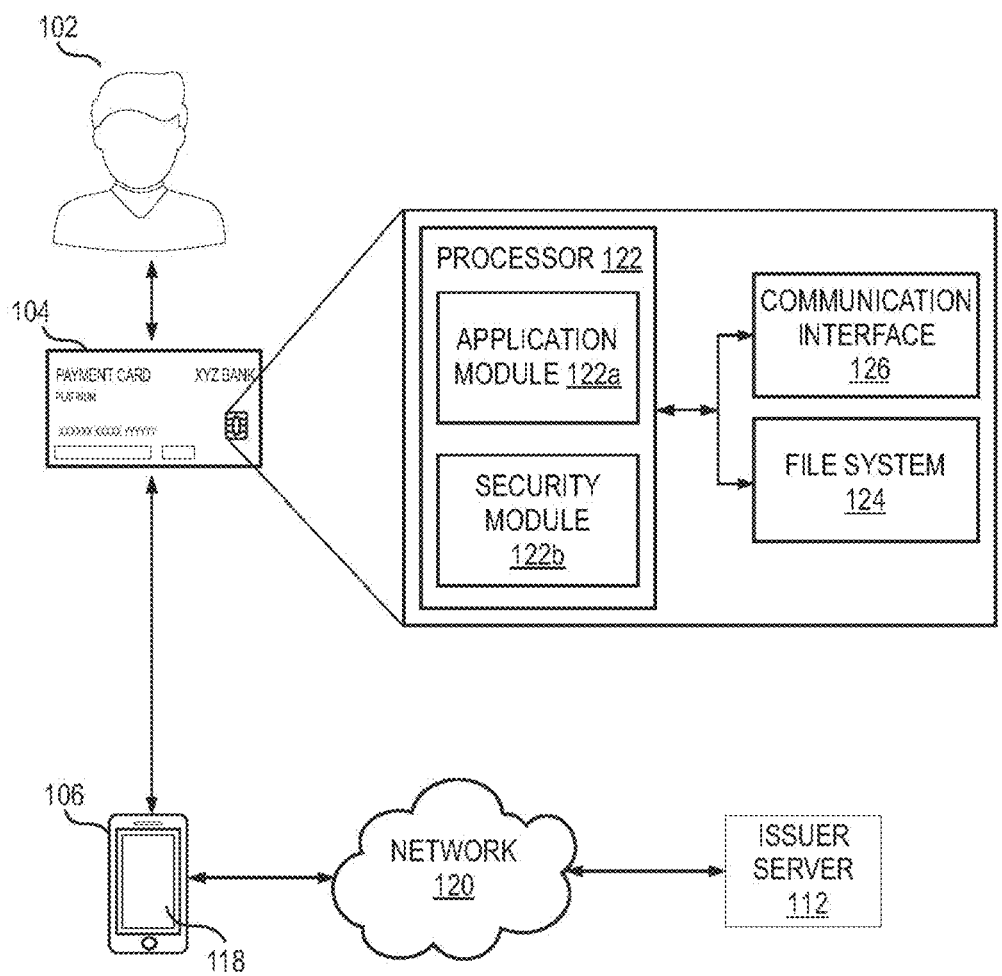
FIG. 2 represents a block diagram of a payment card and user device facilitating controlling payment transactions of the payment card, in accordance with some embodiments of the present disclosure.

FIG. 2 illustrates a simplified block diagram 200 including the payment card 104 and the user device 106 associated with the user 102, the issuer server 112, and the network 120, in accordance with an example embodiment. It is exemplarily shown that the user device 106 has a payment application 118 installed on the user device 106. The payment card 104 includes a plurality of components such as a processor 122, a file system 124, and a communication interface 126. The processor 122 may further include components such as an application module 122a and a security module 122b. The file system 124 may store user data, card details, value of the counter, value of the amount limit etc. The payment card 104 and the payment application 118 may be provided by the issuer server 112 or any other third-party server. The payment card 104, the user device 106 and the issuer server 112 may communicate with each other through the network 120.

In one example embodiment, the user may utilize the payment application 118 on the user device 106 to control payment transactions performed by the payment card 104. The payment transactions are controlled by controlling a plurality of functionalities of the payment card 104. The functionalities such as allowed number of payment transactions, an amount limit on the payment card, etc., may be controlled by the user 102 using the payment application 118. The payment application 118 may be provided and maintained by the issuer server 112. The payment application may be downloaded on the user device 106, from the issuer server directly or from any third-party server. The issuer server 112 is associated with the issuer bank that may have issued the payment card 104 to the user 102.

In an embodiment, the issuer server 112 is configured to personalize each and every payment card such as the payment card 104 before its issuance. Personalization is a process that includes adding the card number, user name, expiry date and other required information on the payment card 104. Further, the application required by the payment card 104 to perform payment transactions is installed on the payment card 104. The application module 122a is configured to maintain the application required to perform payment transactions. Further, the issuer server 112 is also configured to provide permissions to the processor 122 or in particular to the application module 122a to access the security module 122b and the file system 124. In an embodiment, the issuer server 112 may store a security key in the security module 122b or the file system 124 of the payment card 104 during the personalization. A unique ID is also stored in the file system 124 of the payment card 104 during the personalization. The unique ID is the user identity that is given to the user by the issuer server 112. The same user ID is also stored in the payment application 118 on the user device 106. For example, the unique ID or the user ID may be "ABX1323" for the user 102 and may be stored in the payment card 104 during personalization.

In an example, the user 102 downloads the payment application 118 on the user device 106 and gets enrolled on the payment application 118 by using the user ID provided by the issuer server 112. Further, the payment application authenticates the user 102 and facilitates the user device 106 to store the user ID. The user after enrollment can utilize only the user device 106 to control functionalities of the payment card 104. In an embodiment, if the user 102 is not enrolled and the user taps the payment card 104 on the user device 106 to control a functionality of the payment card 104, the payment application may display an enrollment interface (not shown in FIGs) to the user 102 on the user device 106.

Further, in an example embodiment, when the user 102 wants to control the payment transactions in the payment card 104 such as setting a limit to the number of allowed transactions or setting an amount limit on the payment card 104, the user opens the payment application 118 on the user device 106 and taps the payment card 104 on the user device 106. In the example, the user device 106 and the payment card 104 are both equipped with NFC components and can communicate with each other when brought into a near field. In another embodiment, other short-range communications may be used to establish communication between the payment card 104 and the user device 106. The payment card is configured to establish a communication with the user device 106 only if the payment application 118 is opened on the user device 106.

In an alternate embodiment, when the payment card 104 is brought near the user device 106, the payment application 118 may be automatically launched on the user device 106. Further, the payment card 104 may establish a communication with the payment application 118.

After the establishment of the communication with the payment application 118, the payment application 118 may display an interface including actionable buttons that may be selected by the user 102 in order to perform an action on the payment card 104. The payment application 118 may display options such as set a counter, reset a counter, change a counter or set an amount limit on the payment card 104. The user may choose any one of the options based on the action that he/she wants to take on the payment card 104. In an example, the user 102 may choose to change the counter. The option "change the value of the counter" refers to changing the value of the counter stored on the counter to another value other than the existing value. The payment application 118 may further display another interface to the user 102 which enables the user 102 to enter the desired value to which he/she wants to change the counter. In the example, the user 102 may provide an input depicting that he/she wants to change the value of the counter to +02. After the user has provided his option and the desired value, the payment application 118 may further send a request to the issuer server 112 for an encrypted user ID and a code to perform the action chosen by the user 102. The payment application 118 may also send the user ID associated with the user 102 that is stored during the enrollment process, to the issuer server 112. In the example, the payment application 118 may send the user ID ABX1323 to the issuer server in order to receive a user ID in an encrypted form along with a request for a code to change the counter to +02.

Similarly, set the counter refers to setting a value of the counter from 0 to a desired value and resetting the value of the counter refers to resetting the current value of the counter to 0 from any other existing value. Further, setting the value of the amount limit refers to setting a 6-byte value on the payment card 104 aligning with the EMV specifications that depicts the maximum limit of amount that can be transacted by the payment card 104.

Further, after the issuer server 112 has received the user ID and the request for a code corresponding to the option selected by the user 102, the issuer server 112 is configured to encrypt the user ID using a security key. The security key may be exclusive to the user 102 and may be stored in a database maintained by the issuer server 112 (not shown in FIG. 2). The same security key may also be stored in the payment card 104 during the personalization of the payment card 104 by the issuer server 112. The issuer server may also generate a code corresponding to the option selected by the user 102 in order to perform an action on the payment card 104. In the example, the issuer server 112 may encrypt the user ID ABX1323 using the security key and then generate a code to change the counter on the card from the existing value to +02. Further, a command signal may be sent to the payment application 118 from the issuer server 112, wherein the command signal includes the encrypted user ID and the code to change the value of the counter.

In an alternate embodiment, the payment application 118 may just send the user ID to the issuer server and request a signal for receiving an encrypted user ID. The code to perform the action based on the option chosen by the user 102 may be generated by the payment application 118 itself on the user device 106. In the embodiment, the issuer server 112 is configured to only encrypt the user ID using a security key and send it back to the payment application 118 on the user device 106.

Further, after the issuer server 112 has sent the command signal including the encrypted user ID and the code to perform the action chosen by the user 102, the payment application 118 is configured to send the command signal to the payment card 104 if the payment card 104 is still in communication with the payment application 118 through the NFC component. In the example, the payment application 118 may send the command signal including the encrypted user ID ABX1323 and the code to change the value of the counter on the card from the existing value to +02 to the payment card 104.

In one embodiment, after the payment card 104 receives the command signal from the payment application 118, the payment card 104 may decrypt the user ID present in the encrypted form using the security key stored in the security module 122b or the file system 124 of the payment card 104. The encryption and decryption in the embodiment explained in the disclosure are performed using a symmetric key. A symmetric key is a cryptographic key that can be used for both encryption and decryption purposes. In the example, the security key used to encrypt the user ID, by the issuer server 112 and the security key used to decrypt the user ID on the payment card 104 are the same and are examples of a symmetric key. Data can be encrypted and decrypted using the same key. Here the security module 122b of the processor 122 may decrypt the encrypted user ID to get the user ID ABX1323.

The security module of the processor 122 may further match the decrypted user ID and a unique ID stored in the security module 122b or the file system of the payment card 104. In the example, the unique ID will be ABX1323 and may be stored in the file system 124 of the payment card 104 during the personalization process, by the issuer server 112. The decrypted user ID will also be ABX1323 and may be matched with the unique ID. For example, if the decrypted user ID and the unique ID do not match, the payment card may decline the communication with the corresponding payment application 118 and not execute the code present in the command signal.

Further, in an embodiment, after the decrypted user ID and the unique ID are matched, the processor 122 of the payment card 104 is configured to execute the code present in the command signal. The code when executed may facilitate one of setting a counter, resetting a counter, change the counter and set a value of the amount limit on the payment card 104. The processor 122 of the payment card may include the software components needed to execute the code present in the command signal. In the example, the code may include the instructions to change the existing value of the counter to +02. The code may be executed by the processor 122 after the decrypted user ID ABX1323 is matched with the unique ID stored in the card which may be ABX1323 as well. In other embodiments, the code may include instructions to set the value of the counter from 0 to a desired value, reset the value of the counter to 0 or set the value of the amount limit on the payment card 104.

Further, after the code is executed by the processor 122 of the payment card 104, the processor 122 is configured to store the value of the counter in the file system 124 of the payment card 104. The value of the counter may be stored in an 8-bit, 16-bit or 32-bit binary format, it may be a negative value or a positive. The least significant bit being −1 and the most significant being +1. In another embodiment, the value of the amount limit may be stored in the payment card 104 instead of the value of the counter. The value of the amount limit will be stored in a 6-byte format aligning with the EMV specifications.

Hence, as disclosed above, the user 102 changes the value of the counter on the payment card 104 from an existing value to +02 using the payment application 118 installed on the user device 106. Similarly, the user 102 may set or reset the value of the counter on the payment card 104 or set a value of the amount limit on the payment card 104. The value of the counter set to +02 depicts that the payment card 104 may be used to make two payment transactions by the user 102 or any other person associated with the payment card 104.

In an example embodiment, the payment card 104 may be configured to act as a normal card without any limitations on the number of allowed payment transactions or an amount limit if the value of the counter is set to a pre-defined constant. The pre-defined constant may be "−01", i.e., if the value of the counter is set to −01 on the payment card by the user 102 using the payment application 118, the payment card 104 may be utilized to make any number of transactions and any amount of money as defined by the issuer or the payment network.

Figure 3:
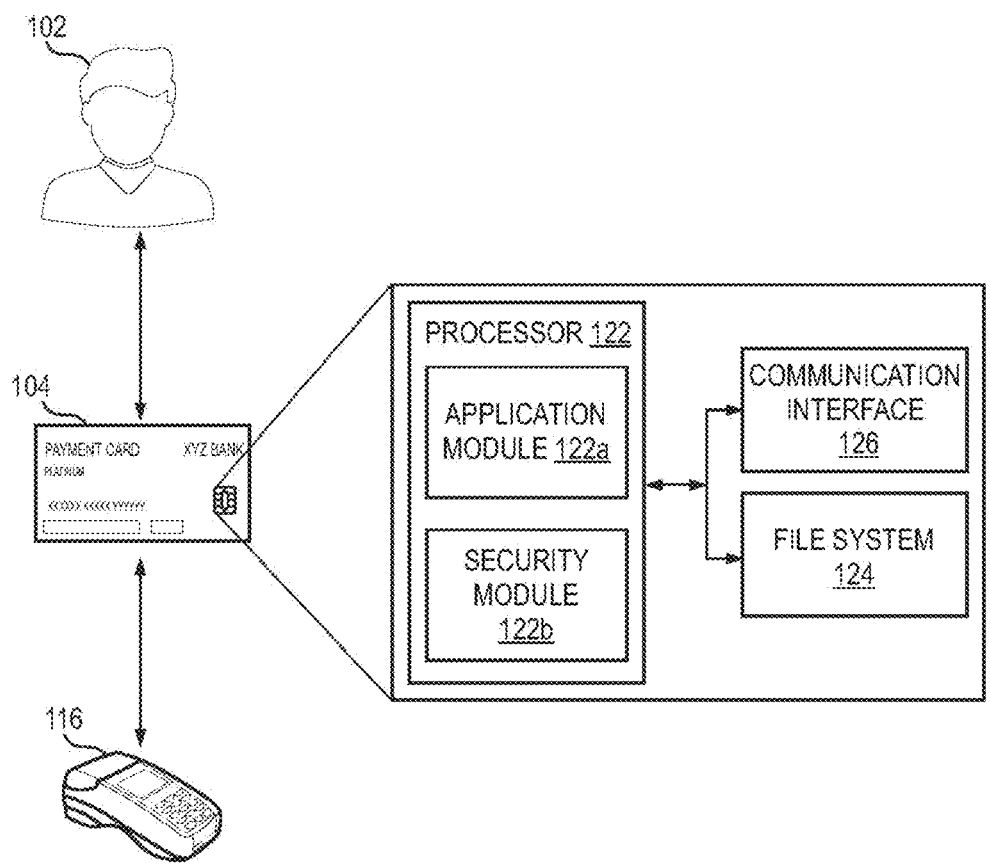
FIG. 3 represents a block diagram of a payment card for making payment at a POS, in accordance with some embodiments of the present disclosure.

Referring now to FIG. 3, a simplified block diagram 300 including the payment card 104 associated with the user 102, a POS terminal 116 and the network 120, is shown, in accordance with an example embodiment. The POS terminal 116 and the payment card 104 are both equipped with the NFC component enabling the establishment of communication between the payment card 104 and the POS terminal 116 when brought nearby to each other. The payment card 104 includes a plurality of components such as a processor 122, a file system 124, and a communication interface 126. The processor 122 may further include components such as an application module 122a, and a security module 122b. The file system 124 may store user data, card details, value of the counter, value of the amount limit, etc. The payment card 104 and the payment application 118 may be provided by the issuer server 112 or any other third-party server. The payment card 104, and POS terminal 116 may communicate with each other through the network 120.

In an embodiment, the user 102 may use the payment card 104 to make a payment transaction at the POS terminal 116. The user 102 may have controlled one or more functionalities of the payment card 104 using the payment application 118 as discussed above in the FIG. 2. In an example, the user 102 may have set a value of the amount limit on the payment card 104 to $2,000 US dollars, and the user 102 may want to make a payment transaction of $1,600 US dollars at the POS terminal 116. The user 102 may present the payment card 104 at the POS terminal to make the corresponding transaction. The user 102 or a merchant (not shown in the FIG) may tap/dip the payment card 104 on the POS terminal 116. The processor 122 of the payment card 104 may establish a communication with the POS terminal 116.

In one embodiment, the POS terminal 116 also includes processor, memory and communication interface (not shown in the FIG) in order to facilitate payment transactions. The POS terminal 116 may determine the application on the payment card 104 required to make a payment transaction. The application on the payment card may be installed on the payment card 104 during the personalization process, by the issuer server 112. The application may be maintained by the application module 122a of the processor 122. The POS terminal 116 may include a plurality of applications stored on it and it also chooses the appropriate application required to enable the payment transaction for the payment card 104.

After the POS terminal 116 determines the application on the payment card 104 for the corresponding payment transaction, the processor 122 of the payment card 104 may read the value of the amount limit set on the payment card 104 and may only proceed for data exchange using APDU only if the value of the amount limit is not equal to a threshold value of the amount limit and is greater than or equal to the payment transaction amount. In an example embodiment, the threshold value of the amount limit may be '0'. In the example, the value of the amount limit is $2,000 US dollars and the user 102 wants to make a payment transaction of $1,600 US dollars. The processor 122 of the payment card 104 may read the value of the amount limit and since it is greater than the payment transaction amount, the processor 122 of the payment card 104 may be configured to exchange data with the POS terminal 116. The payment card 104 is configured to transmit a data exchange signal to the POS terminal 116. The data exchange signal may include the application cryptogram required by the POS terminal 116 to process the payment transaction further through an acquirer, payment network and the issuer server.

In one embodiment, after the data is exchanged with the POS terminal 116, the processor 122 of the payment card 104 is configured to update the value of the counter or the amount limit and store the updated value in the file system 124 of the payment card 104. The updated value may be updated value of the counter or the updated value of the amount limit. The current value of the counter or amount limit may be incremented or decremented as defined by the issuer server 112 or a third-party server responsible for the issuance of the payment card 104. In the example, the value of the amount limit may be updated by decrementing the current value of the amount limit by $1,600 US dollars and the updated value of the amount limit may be stored in the file system 124. Therefore, the 6-byte value equivalent to the remaining $400 US dollars may be stored in the file system 124 as the updated value of the amount limit. In another example, if the value of the amount limit is less than the payment transaction amount, the payment card 104 does not exchange the data with the POS terminal 116.

Similarly, the value of the counter which controls the maximum number of allowed transactions is also read by the payment card 104 and if found to be greater than the threshold value of the counter, data exchange is performed and the value of the counter is updated and stored in the file system of the payment card 104. If the value of the counter is already equal to the threshold value, it means that the maximum number of transactions allowed on the payment card 104 is already reached and the user 102 needs to set a value for the counter using the payment application 118 on the user device 106.

Figure 4:
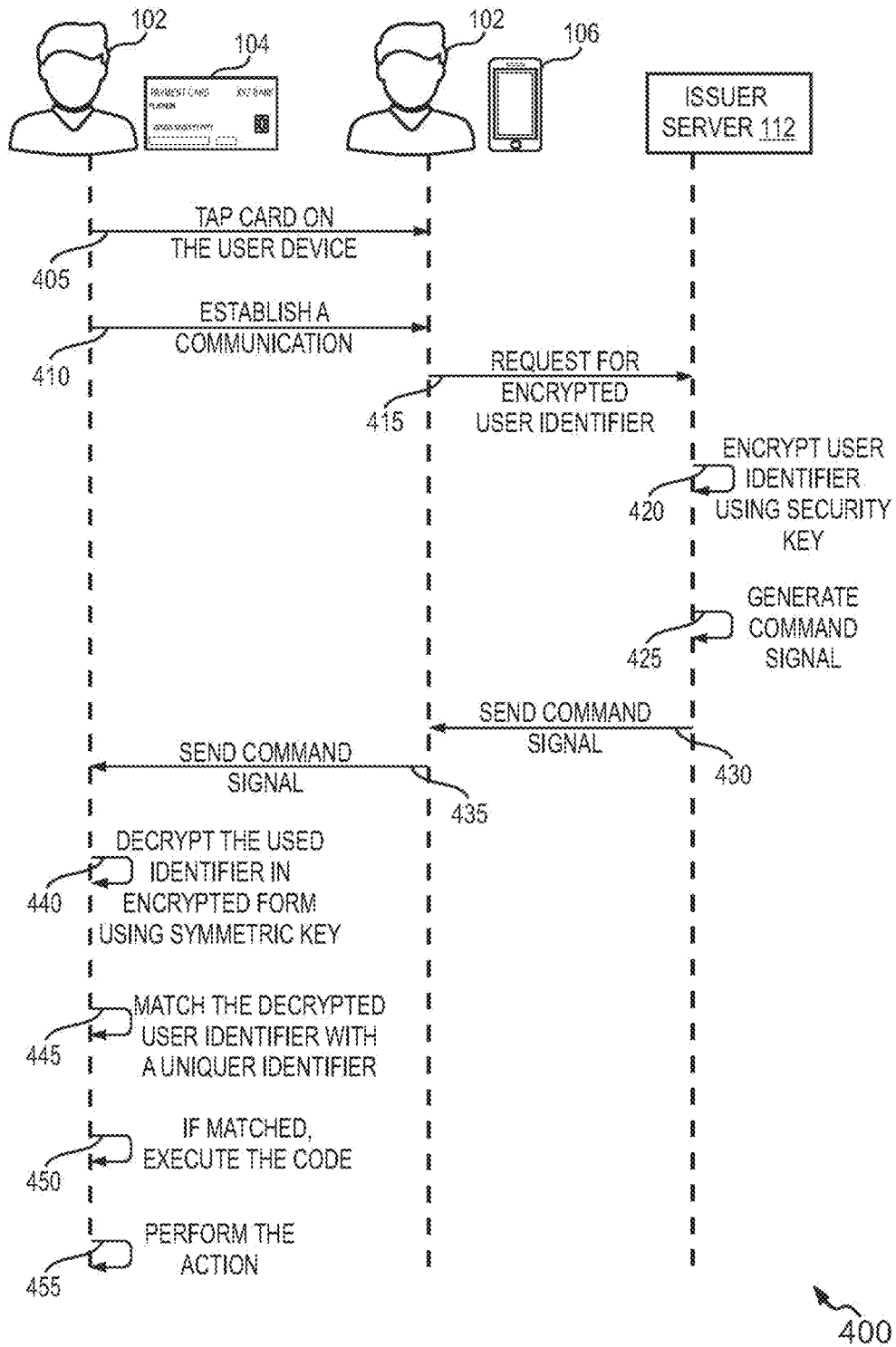
FIG. 4 is a sequence flow diagram for setting a value of a counter on the payment card, in accordance with an example embodiment.

Referring now to FIG. 4, a sequence flow diagram 400 for setting a value of a counter on the payment card 104 using the payment application 118 installed on the user device 106 is shown, in accordance with an example embodiment. The sequence of operations of the sequence flow diagram 400 may not be necessarily executed in the same order as they are presented. Further, one or more operations may be grouped together and performed in the form of a single step, or one operation may have several sub-steps that may be performed in parallel or in a sequential manner.

At 405, the payment application 118 is opened on the user device 106 and the payment card 104 is tapped on (or paired with) the user device 106. The payment card 104 and the user device 106 are equipped with NFC component and can communicate with each other when brought in a near field.

At 410, the processor 122 of the payment card 104 is configured to establish a communication with the user device 106. The communication is established by the NFC component present in the payment card 104. The established communication facilitates data exchange between the payment card 104 and the payment application 118 installed on the user device 106.

After the communication is established, the user 102 may be displayed with an interface to choose an action that he/she wants to perform. The action may be one of set counter, reset counter and change the value of the counter. In some additional embodiments, the user 102 can set a value of the amount limit as well on the payment card 104 using the payment application 118.

After the user 102 has chosen the action to be performed on the payment card 104, at 415, the payment application 118 facilitates the user device to send a request to the issuer server 112 associated with the payment card 104, for an encrypted user ID along with the action to be performed on the payment card 104. The payment application 118 stores the user ID during the enrollment process. The payment application 118 may facilitate the user device 106 to send the user ID to the issuer server 112 in order to receive a command signal back from the issuer server 112.

At 420, the issuer server is configured to encrypt the user ID using a security key. The security key is associated with the user ID and the same security key is stored in the payment card 104 during the personalization of the payment card 104. After the user ID is encrypted, the issuer server generates a code to be executed on the payment card 104 in order to perform the action selected by the user 102 i.e., set counter, reset counter, change counter or set amount limit.

At 425, the issuer server 112 generates a command signal. The command signal includes the user ID in an encrypted form and the code to perform the action selected by the user 102. In an alternate embodiment, the issuer server 112 may only send the encrypted user ID to the payment application 118 on the user device 106. Further, the payment application 118 may generate the code to perform the action selected by the user 102. The payment application 118 may further generate a command signal including the generated code and the encrypted user ID received from the issuer server 112.

At 430, the command signal including the user ID in the encrypted form and the code to perform the action selected by the user 102, is sent to the payment application 118 installed on the user device 106.

At 435, the payment application 118 facilitates the user device 106 to send the command signal to the payment card 104. The command signal including the user ID in an encrypted form and the code when executed performs the action such as set counter, reset counter, change counter or set amount limit on the payment card 104. The command signal is sent to the payment card 104 only when the payment card 104 is still in communication with the payment application 118 on the user device 106.

At 440, after the payment card 104 has received the command signal from the payment application 118 of the user device 106, the security module 122b of the processor 122 of the payment card 104 is configured to decrypt the user ID in the encrypted form using a security key stored in the file system 124 of the payment card 104 during the personalization of the card from the issuer server 112 or a third-party server. The security key is a symmetric key that is stored both on the payment card 104 and the issuer server 112. Symmetric key in cryptography means a key which is used to both encrypt and decrypt data. The security key is a symmetric key and is used to encrypt the user ID, by the issuer server 112 and is further used to decrypt the encrypted user ID, by the payment card. If the symmetric keys are not the same, then the decryption fails.

At 445, the security module 122b of the processor 122 is configured to match the decrypted user ID and a unique ID stored in the file system 124 of the payment card 104 during personalization. The unique ID is same as the user ID and is stored by the issuer server 112 in the payment card during the personalization, before issuance of the payment card 104. The processor of the payment card 104 after decrypting the encrypted user ID received from the payment application 118, is configured to match the decrypted user ID and the unique ID.

If the decrypted user ID and the unique ID are matched, at 450, the processor 122 of the payment card 104 is configured to execute the code present in the command signal received from the payment application 118. The code when executed may facilitate setting a value of the counter, resetting the value of the counter, changing the value of the counter or setting a value of the amount limit on the payment card. Only if the matching process of step 445 is successful, the code in the command signal is executed by the processor 122 of the payment card 104. Else, the request to perform an action on the payment card 104 is declined by the payment card 104.

At 455, after the code is executed, the processor of the payment card is configured to perform the action associated with the executed code. The action may be one of set a value of the counter, reset a value of the counter, change a value of the counter or set an amount limit on the file system 124 of the payment card 104. The counter value is configured to limit the number of transactions allowed on the payment card 104.

In an example embodiment, the code when executed may facilitate the processor 122 of the payment card 104 to set the value of the counter to +03. The value of the counter +03 depicts that the payment card 104 can be utilized to make 3 payment transactions and any number exceeding the value will result in precluding the payment card 104 from making any transaction. The user may set a value again or change the already set value or also reset the value of the counter using the payment application 118.

In another example embodiment, the value of the counter may be set to a pre-defined constant, for example, −01. The payment card 104 may be configured to act as a normal payment card and may allow any number of transactions, without any preclusion based on the pre-defined constant. Therefore, if the value of the counter is set to −01, there may not be any limit on the number of allowed transactions on the payment card 104.

In another embodiment, an amount limit may be set on the payment card based on the code present in the command signal. The amount limit may not be in the form of a counter but may be stored in a 6-byte format aligning with the EMV specification. This format of storing the value is easy to store on the payment card 104 and makes it easy to compare when the payment card 104 is being utilized to make transactions.

Figure 5:
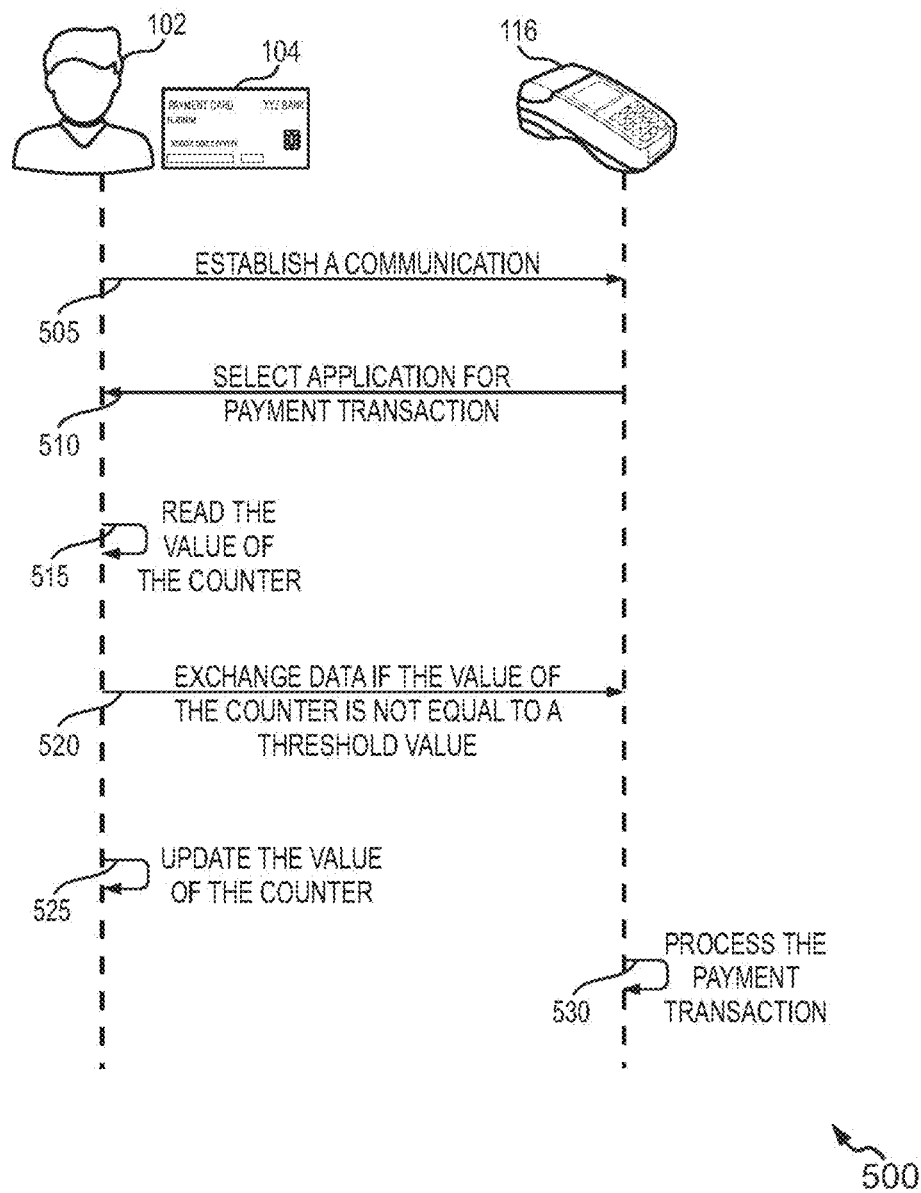
FIG. 5 is a sequence flow diagram for making a payment using the payment card including a set value of the counter, in accordance with an example embodiment.

Referring now to FIG. 5, a sequence flow diagram 500 for facilitating a payment transaction using the payment card 104 at a POS terminal 116, in accordance with an example embodiment is shown. The sequence of operations of the sequence flow diagram 500 may not be necessarily executed in the same order as they are presented. Further, one or more operations may be grouped together and performed in the form of a single step, or one operation may have several sub-steps that may be performed in parallel or in a sequential manner.

At 505, the payment card 104 is brought in contact with the POS terminal 116. The POS terminal 116 and the payment card 104 are both NFC enabled and can communicate with each other when brought nearby. In an example embodiment, the user 102 may handover the card to a merchant or may dip the payment card 104 on the POS terminal 116 by himself/herself. The processor 122 of the payment card 104 is configured to establish a communication with the POS terminal 116 using the NFC component. In an embodiment, other short field communications may be used for the communication between the POS terminal 116 and the payment card 104.

At 510, the POS terminal 116 is configured to determine and access an application present on the payment card 104 required for the corresponding transaction. The POS terminal may support a plurality of applications corresponding to a plurality of card types and card issuers. Therefore, when the payment card 104 needs to make a transaction via the POS terminal 116, the POS terminal 116 is configured to select the application on the payment card 104 which may be suitable for the transaction. In an embodiment, the POS terminal 116 may select the application facilitated by the application module 122a of FIG. 2.

At 515, the processor of the payment card is configured to read the value of the counter stored in the file system 124 of the payment card 104. The value of the counter may be set to any number, or a pre-defined constant by the user 102 using the payment application 118 on the user device 106. After the POS terminal 116 selects the application to perform the transaction, the payment card 104 reads the value of the counter stored in the payment card 104 in order to proceed with the payment.

In an alternate embodiment, the payment card 104 may read the amount limit set on the payment card instead of the value of the counter. The amount limit set on the payment card 104 is configured to limit the transaction amount that can be transacted using the payment card 104 until set to another limit again.

At 520, if the read value of the counter is not equal to a threshold value, the payment card 104 is configured to exchange the data with the POS terminal 116, wherein the exchanged data is required by the POS terminal 116 to perform the transaction. In an embodiment, the APDU may be utilized by the payment card 104 for the data exchange between the POS terminal 116 and the payment card 104. The command and data exchange are facilitated by the APDU present on the payment card. The processor 122 of the payment card 104 is configured to transmit a data exchange signal to the POS terminal 116. In an example, the threshold value of the counter may be 0 and if the value of the counter is equal to 0, then the data exchange will not be performed by the payment card 104. Otherwise, if the value of the counter is not equal to the threshold value i.e., 0, then the APDU facilitated data exchange is performed with the POS terminal 116.

At 525, the payment card 104 is configured to update the value of the counter after the exchange of data with the POS terminal 116. The updated value of the counter may be a decremented value of the counter that was present in the payment card 104. Further, the updated value will be stored in the file system 124 of the payment card 104. In an alternate embodiment, the amount limit set on the card may be updated by the payment card 104 and stored in the file system 124. In an example, if the value of the counter was set to +03 before data exchange, the value may be decremented by 1 and may be updated to +02 and stored in the file system 124 after the exchange of data.

At 530, the POS terminal is further configured to process the payment transaction in the normal Business as Usual (BAU) format which is already present in the art. The as usual pull payment, that goes through the acquirer server, payment network server and the issuer server is facilitated by the POS terminal 116 as per the standard service flow after the payment card 104 exchanges data with the POS terminal 116.

FIG. 6A-6D, collectively represent example representations of the payment application 118 displayed on the user device 106.

Figure 6A:
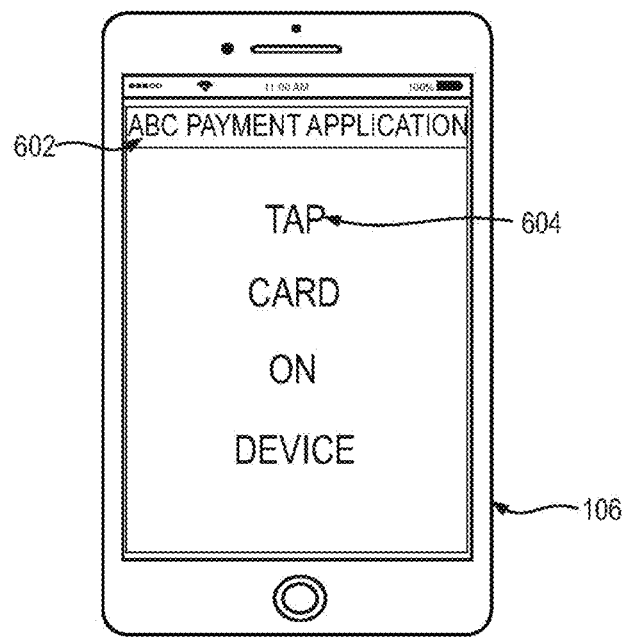
FIGS. 6A, 6B, 6C, and 6D collectively, represent an example representation of the payment application installed on a user device with corresponding User Interfaces (UIs), in accordance with an example embodiment.

FIG. 6A illustrates a UI representation 600 of the payment application 118 displayed on the user device 106 of the user 102 who wants to control payment transactions in the payment card 104 using the payment application 118 installed on the user device 106. The payment application may be provided by the issuer server 112 of FIG. 1 or any other third-party server. The UI representation 600 is exemplarily shown to display the name 602 of the payment application 118 to be "ABC payment application". Further, the UI representation 600 is exemplarily shown to display a message 604 with an exemplary text "Tap the card on the device". It is assumed that both the payment card 104 and the user device 106 are equipped with NFC component and can communicate when brought near to one another. Therefore, the message 604 displayed to the user 102 instructs the user 102 to tap the payment card 104 on the user device 106 in order to communicate with the payment card 104.

When the payment card 104 is tapped/dipped neat the user device 106, the payment card 104 establishes a communication with the payment application 118 installed on the user device 106. The payment application 118 is further configured to provide options to the user 102 to control functionalities of the payment card 104.

In an alternate embodiment, other forms of contactless communications may be used for the communication between the user device 106 and the payment card 104.

Figure 6B:
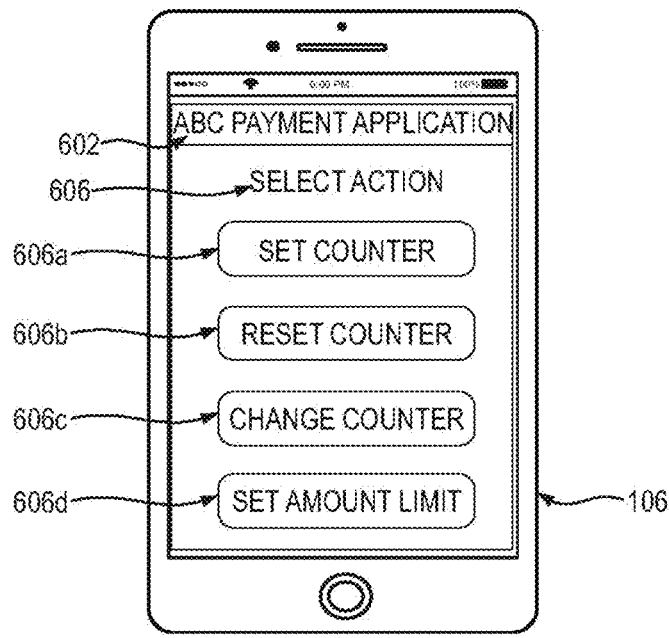

FIG. 6B illustrates a UI representation 620 of the payment application 118 on the user device 106 after the user 102 has opened the payment application 118 on the user device 106 and has tapped the payment card 104 on the user device 106. The UI representation 620 is exemplarily shown to display the name 602 of the payment application 118 to be "ABC payment application". The UI representation 620 is exemplarily shown to display a heading 606 with the text "Select Option". The heading 606 depicts that the user 102 has to select one of the many options provided to the user 102 on the UI representation 620. The options are displayed to the user 102 in a list format and all the options are clickable buttons. The options are exemplarily shown to be "Set counter" 606a, "Reset counter" 606b, "Change counter" 606c and "Set amount limit" 606d. Each of the options is different and if selected by the user 102, facilitates the payment application 118 to perform different operations.

Figure 6C:
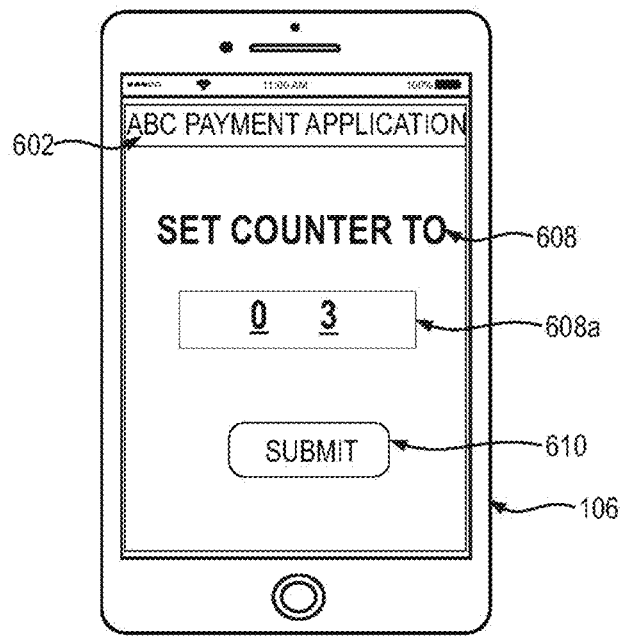

FIG. 6C illustrates a UI representation 640 of the payment application 118 on the user device 106 after the user 102 has selected the option "set counter" 606a. The UI representation 640 is exemplarily shown to display the name 602 of the payment application 118 to be "ABC payment application". The UI representation 640 is exemplarily shown to display heading 608 with the text "set counter to:", further, a selectable text area 608a is displayed on the UI representation 640. The text area 608a when selected, may display a digital keyboard to the user 102 on the user device 106. The user 102 may then type a desired number on the digital keyboard. It is exemplarily shown in the UI representation 640 that the user 102 has entered the value "03" in the selectable text area 608a. It depicts that the user 102 has to set the value of the counter on the payment card 104 to "+03". Another actionable icon 610 is displayed on the UI representation 640 with the text "Submit". The icon 610 may be selected by the user to submit the entered value in the text area 608a.

In an example embodiment, after the user 102 enters a value and submits it on the payment application 118, the payment application 118 may send the user ID associated with the user 102 to the issuer server 112 associated with the payment card 104 of the user 102. The payment application 118 may further request the issuer server 112 to send an encrypted user ID and a code to set the value of the counter to a value entered by the user 102. The issuer server 112 may further encrypt the user ID and determine a code to set the value of the counter on the payment card 104 to the value entered by the user 102. The encrypted user ID and the code to set the value of the counter is sent back to the payment application 118 on the user device 106 in the form of a command signal, by the issuer server 112. The payment application 118 is further configured to transmit the command signal received from the issuer server 112 to the payment card 104. In the example, the code when executed is configured to set the value of the counter to +03.

The payment card 104 may further decrypt the encrypted user ID received from the payment application 118 and match the decrypted user ID with a unique ID stored in the payment card 104 during personalization of the payment card 104. If a match is found between the decrypted user ID and the unique ID, then the code in the command signal is executed by the payment card 104. The executed code may set, reset or change the counter, or may set an amount limit on the payment card 104.

Figure 6D:
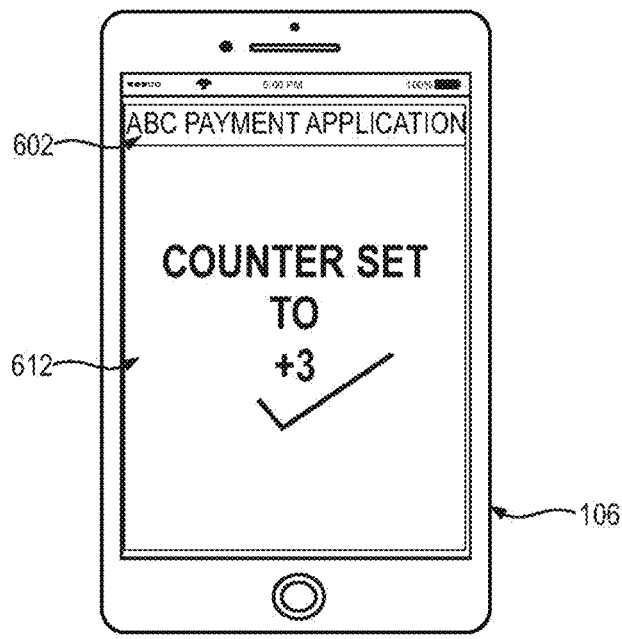

FIG. 6D illustrates a UI representation 660 of the payment application 118 on the user device 106 after the code is executed by the payment card 104 and the value of the counter is set to +03. The UI representation 660 is exemplarily shown to display the name 602 of the payment application 118 to be "ABC payment application". The UI representation 660 further displays a confirmation message 612 with the text "Counter set to +03". The confirmation message 612 may be displayed to the user 102 only if the decrypted user ID and the unique ID stored on the payment card 104 match and the code is executed by the payment card 104, else the payment card doesn't execute the code.

Figure 7:
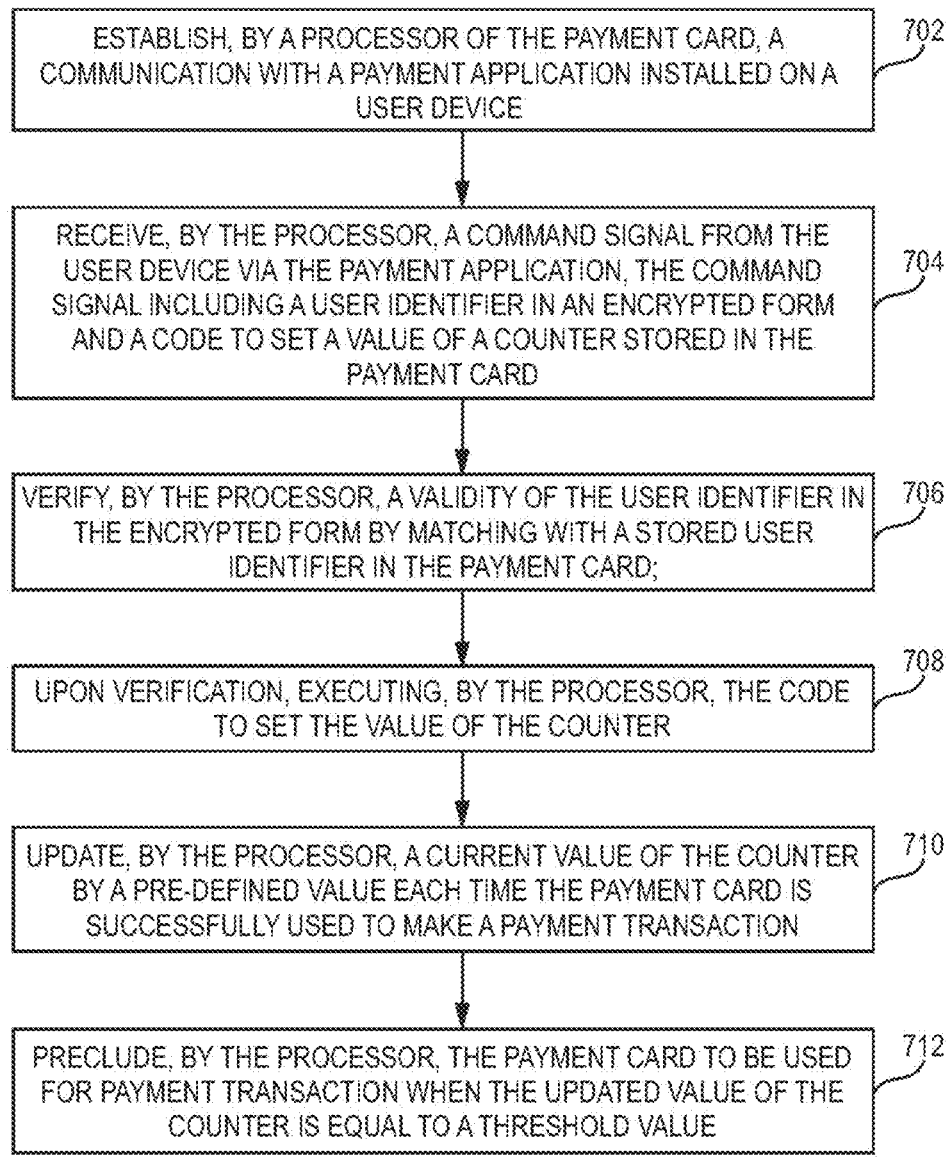
FIG. 7 illustrates a flow diagram of a method for controlling payment transactions of a payment card, in accordance with an example embodiment.

FIG. 7 illustrates a flow diagram of a method 700 for facilitating controlling payment transactions of a payment card, in accordance with an example embodiment. The method 700 depicted in the flow diagram may be executed by, for example, the payment card 104. The operations of the method 700, and combinations of operation in the flow diagram, may be implemented by, for example, hardware, firmware, a processor, circuitry and/or a different device associated with the execution of software that includes one or more computer program instructions. The method 700 starts at operation 702.

At 702, the method 700 includes, establishing, by a processor 122 of the payment card 104, a communication with a payment application 118 installed on a user device 106. The payment card 104 and the user device 106 are both NFC enabled and when brought near to each other, can communicate using NFC. In an embodiment, the user 102 opens the payment application 118 on the user device 106 and taps the payment card 104 on the user device 106. The processor of the payment card 104 is configured to establish a communication with the payment application 118.

At 704, the method 700 includes, receiving, by the processor 122, a command signal from the user device 106 via the payment application 118, the command signal including a user identifier in an encrypted form and a code to set a value of a counter stored in the payment card. The user identifier is encrypted by an issuer server associated with the payment card 104 such as the issuer server 112 and sent to the payment application 118 installed on the user device. The encryption is performed using a security key which is also stored in the payment card that can be used to decrypt the user ID in the encrypted form.

At 706, the method 700 includes, verifying, by the processor 122, a validity of the user identifier in the encrypted form by matching with a stored user identifier in the payment card 104. The payment card 104 decrypts the user ID in the encrypted form using a security key stored in the file system 124 of the payment card and matches the decrypted user ID with a unique ID associated with the user 102 stored in the file system 124. If a match is found, the processor verifies the validity of the user ID that it was encrypted by an authentic issuer.

Upon verification, at 708, the method 700 includes, executing, by the processor 122, the code to set the value of the counter. The code present in the command signal received from the user device is executed if the verification at 706 is successful. A value is set for the counter when the code is executed by the processor 122 and stored in the file system 124.

At 710, the method 700 includes, updating, by the processor 122, a current value of the counter by a pre-defined value each time the payment card is successfully used to make a payment transaction. In an embodiment, the value of the counter is decremented by a pre-defined value each time the payment card 104 is utilized to make a payment transaction.

At 712, the method 700 includes, precluding, by the processor 122, the payment card 104 to be used for payment transaction when the updated value of the counter is equal to a threshold value. In an embodiment, when the value of the counter on the payment card 104 has reached a pre-defined value such as 0 or the maximum limit, the payment card 104 is precluded to perform any payment transaction. The predefined value for the counter at which the payment card 104 is precluded from payment transactions is set by the issuer server such as issuer server 112 or any third-party server.

Figure 8:
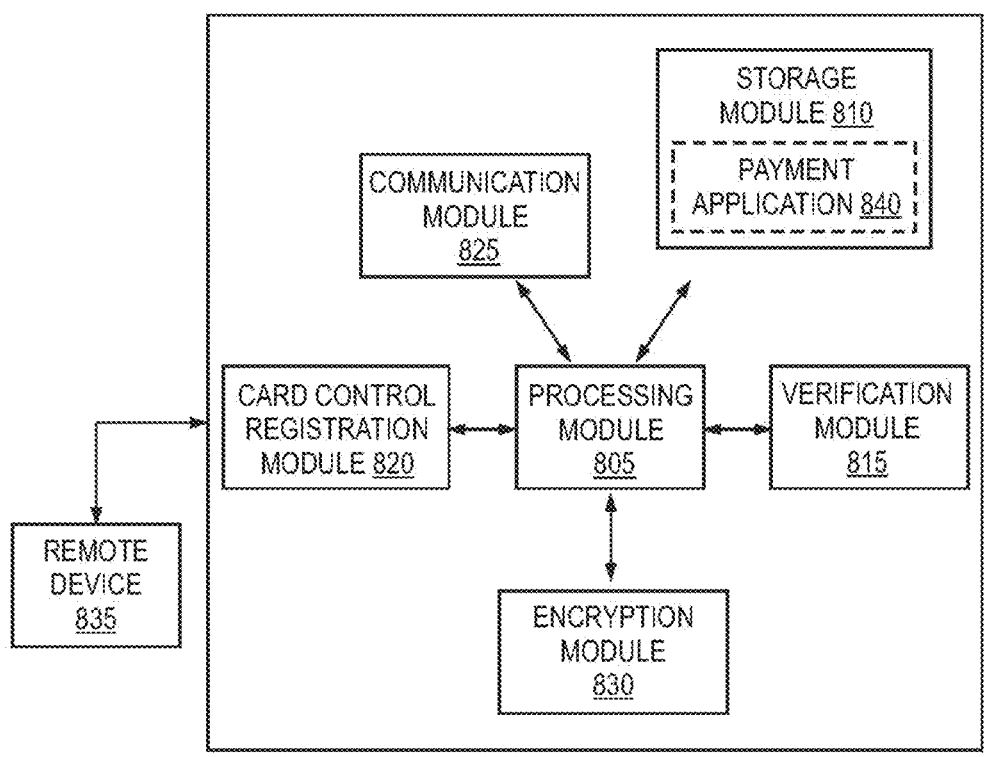
FIG. 8 is a simplified block diagram of an issuer server, in accordance with one embodiment of the present disclosure.

FIG. 8 is a simplified block diagram of an issuer server 800, in accordance with one embodiment of the present disclosure. The issuer server 800 is an example of the issuer server 112 of FIG. 1. The issuer server 800 is associated with an issuer bank/issuer, in which a user may have an account and has a credit/debit card associated with the account, wherein the payment card can be controlled using a payment application 118 of FIG. 1, provided by the issuer server 800. The issuer server 800 includes a processing module 805 operatively coupled to a storage module 810, a verification module 815, a card control registration module 820, a communication module 825 and an encryption module 830.

The storage module 810 is configured to store machine executable instructions to be accessed by the processing module 805. The storage module 810 includes program instructions for facilitating a payment application 840. The processing module 805 is capable of executing the stored machine executable instructions of the payment application 840 (e.g., the payment application 118 of FIG. 1) in the storage module 810 or within the processing module 805 or any storage location accessible to the processing module 805. Additionally, the storage module 810 stores information related to, contact information of the user, bank account number, BINs, payment card details (if at all purchased by the user), mobile numbers of the users for facilitating mobile banking, internet banking information, PINs, MPINs for mobile banking and the like. This information is retrieved by the processing module 805 for cross-verification during payment transactions.

The card control registration module 820 is configured to facilitate a user to register/enroll for USSD based payment transactions, IMPS based payment transactions and the like using his mobile phone number. In one embodiment, the card control registration module 820 includes logics to generate MPIN that is uniquely associated with each registered mobile phone number of the user and needs to be authenticated for processing the mobile banking based payment transactions. The MPINs generated by the card control registration module 820 are stored in the storage module 810 for later retrieval by the processing module 805 for verification purposes.

The encryption module 830 is configured to take the user ID as input and encrypt the user ID using a security key. The security key may be symmetric with respect to the security key stored by the issuer server 800 during the personalization of a payment card. Symmetric key refers to a key that is used to both encrypt and decrypt a message or some data. Here, the issuer server 800 using the encryption module 830 encrypts a user ID received from the payment application 118 of FIG. 1 using a security key which is also stored in the payment card associated with the user ID during personalization. If the payment card is authentic, the encrypted user ID can be decrypted by the security key stored in the card during personalization. Otherwise, the decryption may fail.

The processing module 805 is configured to communicate with one or more remote devices such as the remote device 835 using the communication module 825 over a network such as the network 120 or the payment network 108 of FIG. 1. The examples of the remote device 835 include POS terminal 116, the user device 106, the payment server 110, the acquirer server 114, other computing systems of issuer and payment network 108 and the like. The communication module 825 is capable of facilitating such operative communication with the remote devices and cloud servers using API (Application Program Interface) calls. The communication module 825 is further configured to cause display of user interfaces (UIs) on the user device 106 to enable the user to enter options to perform action on the payment card, and enter the desired value for the counter or the amount limit.

Figure 9:
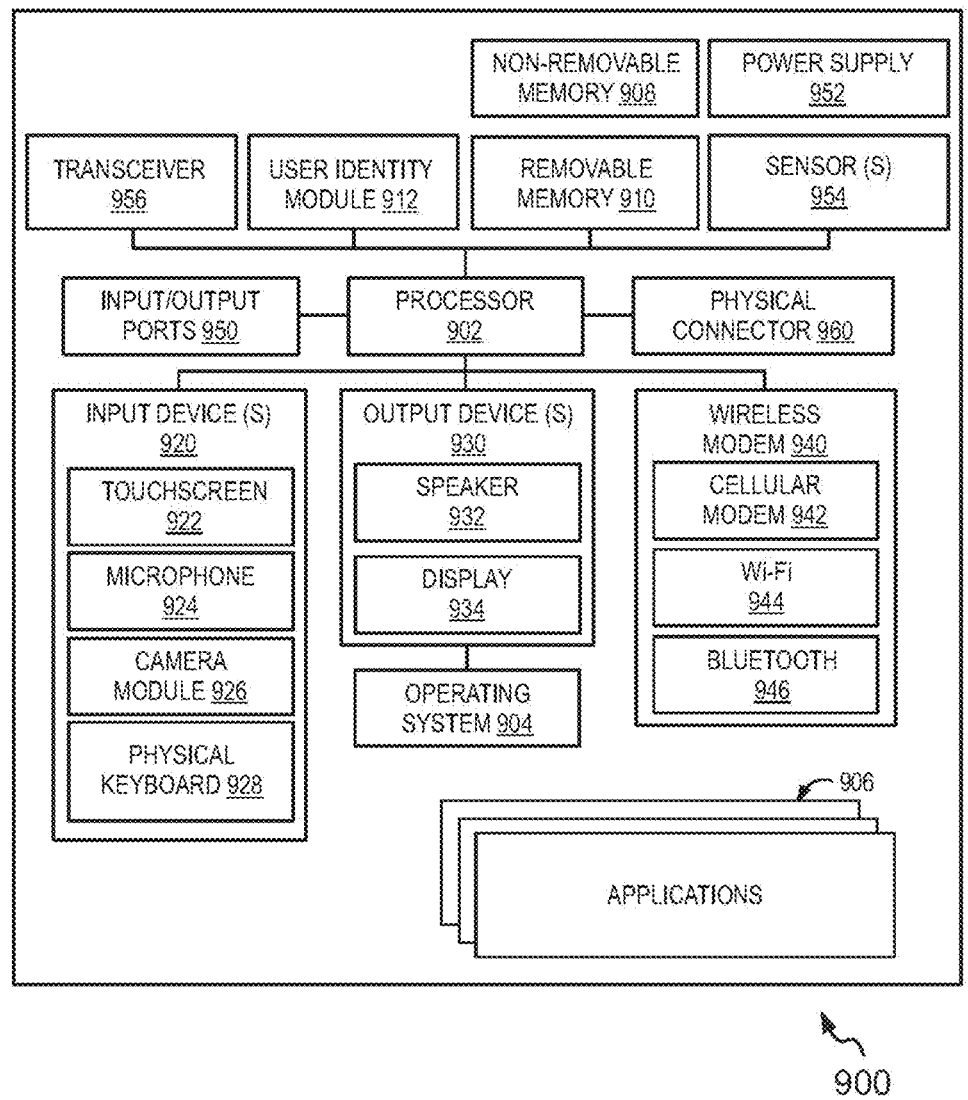
FIG. 9 is a simplified block diagram of a remote device, in accordance with one embodiment of the present disclosure.

FIG. 9 shows a simplified block diagram of a user device 900, for example, a mobile phone or a desktop computer capable of implementing the various embodiments of the present disclosure. For example, the user device 900 may correspond to the user device 106 of FIG. 1. The user device 900 is depicted to include one or more applications 906 such as the payment application 118 of FIG. 1. The payment application 118 can be an instance of an application downloaded from any of the servers 112, 114, 110 or a third-party wallet server. The payment application 118 is capable of communicating with any of the servers 112, 114 or 110 for facilitating controlling payment transactions of the payment card 104.

It should be understood that the user device 900 as illustrated and hereinafter described is merely illustrative of one type of device and should not be taken to limit the scope of the embodiments. As such, it should be appreciated that at least some of the components described below in connection with the user device 900 may be optional and thus in an example embodiment may include more, less or different components than those described in connection with the example embodiment of the FIG. 9. As such, among other examples, the user device 900 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 900 includes a controller or a processor 902 (e.g., a signal processor, microprocessor, ASIC, or other control and processing logic circuitry) for performing such tasks as signal coding, data processing, image processing, input/output processing, power control, and/or other functions. An operating system 904 controls the allocation and usage of the components of the user device 900 and supports for one or more payment transaction applications programs (see, the applications 906) such as the wallet application, that implements one or more of the innovative features described herein. In addition to the wallet application, the applications 906 may include common mobile computing applications (e.g., telephony applications, email applications, calendars, contact managers, web browsers, messaging applications) or any other computing application.

The illustrated user device 900 includes one or more memory components, for example, a non-removable memory 908 and/or removable memory 910. The non-removable memory 908 and/or the removable memory 910 may be collectively known as a database in an embodiment. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904 and the applications 906. The user device 900 may further include a user identity module (UIM) 912. The UIM 912 may be a memory device having a processor built in. The UIM 912 may include, for example, a subscriber identity module (SIM), a universal integrated circuit card (UICC), a universal subscriber identity module (USIM), a removable user identity module (R-UIM), or any other smart card. The UIM 912 typically stores information elements related to a mobile subscriber. The UIM 912 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 900 can support one or more input devices 920 and one or more output devices 930. Examples of the input devices 920 may include, but are not limited to, a touch screen/a display screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video images) and a physical keyboard 928. Examples of the output devices 930 may include, but are not limited to, a speaker 932 and a display 934. Other possible output devices can include piezoelectric or other haptic output devices. Some devices can serve more than one input/output function. For example, the touch screen 922 and the display 934 can be combined into a single input/output device.

A wireless modem 940 can be coupled to one or more antennas (not shown in FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device or a local wireless data network or router, and/or a Bluetooth-compatible modem 946. The wireless modem 940 is typically configured for communication with one or more cellular networks, such as a GSM network for data and voice communications within a single cellular network, between cellular networks, or between the user device 900 and a public switched telephone network (PSTN).

The user device 900 can further include one or more input/output ports 950, a power supply 952, one or more sensors 954 for example, an accelerometer, a gyroscope, a compass, or an infrared proximity sensor for detecting the orientation or motion of the user device 900 and biometric sensors for scanning biometric identity of an authorized user, a transceiver 956 (for wirelessly transmitting analog or digital signals) and/or a physical connector 960, which can be a USB port, IEEE 1294 (FireWire) port, and/or RS-232 port. The illustrated components are not required or all-inclusive, as any of the components shown can be deleted and other components can be added.

The disclosed method with reference to FIG. 7, or one or more operations of the method 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smartphone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the payment card 104 and its various components such as processor 122 and the file system 124 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more nonvolatile memory devices, and/or a combination of one or more volatile memory devices and nonvolatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the present disclosure offer multiple advantages and technical effects. For instance, the present disclosure facilitates controlling payment transactions using a companion payment application installed on the user device. The contactless payment cards being utilized for the payment transactions are not secure enough when the card is handed over to someone else to perform the transaction. The present disclosure facilitates the user to control a plurality of functionalities of the payment card. The user may utilize the payment application to set a value of the counter on the payment card. The value of the counter may determine the maximum number of transactions allowed by the payment card. The user can set the counter with the least interference of the issuer. And once the value of the counter is set on the payment card, the issuer does not play any role in reading the value of the counter and proceeds with the data exchange with a POS terminal. The payment card itself is self-sustained to read the value of the counter and to proceed with the payment.

Further, in another embodiment, the present disclosure facilitates setting a value of the counter to a pre-defined constant to make the payment card act like any other normal card with no limitations on the number of allowed transactions. The value of the counter, if is set to the pre-defined constant value, then the payment card may be utilized by the user to make any number of transactions as per the standards set by the issuer or payment network. Further, the user is also capable of setting an amount limit of the card using the payment application which also enhances the security when compared to the payment cards present in the art.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A method for controlling payment transactions in a payment card of a user, the method comprising:
    establishing, by a processor of the payment card of the user, a communication with a payment application installed on a user device of the user;
    receiving, by the processor of the payment card of the user, a command signal from the user device of the user via the payment application, the command signal comprising a user identifier in an encrypted form and a code generated by the payment application to set a value of a counter stored in the payment card;
    decrypting, by the processor of the payment card of the user, the user identifier in the encrypted form using a security key stored in a security domain of the payment card for obtaining a decrypted user identifier;
    matching, by the processor of the payment card of the user, the decrypted user identifier and a unique identifier, wherein the unique identifier is stored in the payment card during personalization of the payment card;
    upon successful match, executing, by the processor of the payment card of the user, the code to set the value of the counter; and
    for each payment transaction at a point of sale (POS) terminal of a merchant:
        reading, by the processor of the payment card of the user and without any input from an issuer of the payment card, the value of the counter;
        when the value of the counter is not equal to a threshold value, exchanging, by the processor of the payment card of the user and without any input from the issuer of the payment card, data with the POS terminal of the merchant that is required by the POS terminal to conduct a payment transaction;
        updating, by the processor of the payment card of the user and without any input from the issuer of the payment card, a current value of the counter by a pre-defined value each time the payment card is successfully used to make a payment transaction at the POS terminal of the merchant for obtaining an updated value of the counter; and
        when the updated value of the counter is equal to the threshold value, precluding, by the processor of the payment card of the user and without any input from the issuer of the payment card, the payment card to be used for the payment transactions.

2. The method as claimed in claim 1, wherein updating the current value of the counter comprises storing, by the processor, the updated value of the counter in a file system of the payment card.

3. The method as claimed in claim 1, wherein the security key is stored in the security domain of the payment card during personalization.

4. The method as claimed in claim 1, wherein updating the current value of the counter comprises:
    updating, by the processor, the value of the counter to a pre-defined constant; and
    enabling, by the processor, the payment card to be used for the payment transactions without preclusion based on the pre-defined constant.

5. The method as claimed in claim 1, wherein executing the code further comprises setting, by the processor, a value of an amount limit, wherein the value of the amount limit corresponds to an allowable amount for the payment transactions using the payment card.

6. The method as claimed in claim 5, further comprising updating the value of the amount limit each time the payment card is utilized to make the payment transaction.

7. The method as claimed in claim 1, further comprising:
    storing, by the user device via the payment application, the user identifier associated with a user;
    transmitting, by the user device, a request signal to send an encrypted user identifier, to an issuer server;
    receiving, by the user device, the user identifier in the encrypted form from the issuer server;
    determining, by the user device, a command comprising the user identifier in the encrypted form and the code to change the value of the counter; and
    transmitting, by the user device, the command to the payment card.

8. The method as claimed in claim 7, further comprising personalizing the payment card prior to issuing the payment card to the user.

9. The method as claimed in claim 8, wherein personalizing the payment card further comprises:
    storing, by the issuer server, the user identifier on an application of the payment card;
    storing, by the issuer server, the security key on a security domain of the payment card; and
    providing, by the issuer server to the application of the payment card, permission to access the security domain and a file system.

10. The method as claimed in claim 1, wherein the payment application installed on the user device is provided by an issuer server associated with the payment card of a user.

11. A payment card of a user comprising:
    a communication interface configured to establish a communication with a payment application installed on a user device of the user;
    a memory comprising executable instructions; and
    a processor communicably coupled to the communication interface, the processor configured to execute the instructions to cause the payment card to at least:
        receive a command signal from the user device of the user via the payment application, the command signal comprising a user identifier in an encrypted form and a code generated by the payment application to set a value of a counter stored in the payment card,
        decrypt, by the processor, the user identifier in the encrypted form using a security key stored in a security domain of the payment card for obtaining a decrypted user identifier, match, by the processor, the decrypted user identifier and a unique identifier, wherein the unique identifier is stored in the payment card during personalization of the payment card, upon successful match, execute, by the processor, the code to set the value of the counter, and for each payment transaction at a point of sale (POS) terminal of a merchant:

read, by the processor and without any input from an issuer of the payment card, the value of the counter, when the value of the counter is not equal to a threshold value, exchange, by the processor and without any input from the issuer of the payment card, data with the POS terminal of the merchant that is required by the POS terminal to conduct a payment transaction, update, by the processor and without any input from the issuer of the payment card, a current value of the counter by a pre-defined value each time the payment card is successfully used to make a payment transaction at the POS terminal of the merchant for obtaining an updated value of the counter, and when the updated value of the counter is equal to the threshold value, preclude, by the processor and without any input from the issuer of the payment card, the payment card to be used for payment transactions.

12. The payment card as claimed in claim 11, wherein for updating the current value of the counter, the payment card is further caused at least in part to:

store the updated value of the counter in a file system of the payment card.

13. The payment card as claimed in claim 11, wherein the security key is stored in a security domain of the payment card during personalization.

14. The payment card as claimed in claim 11, wherein for updating a current value of the counter, the payment card is further caused at least in part to:

update the value of the counter to a pre-defined constant; and enable the payment card to be used for the payment transactions without preclusion based on the pre-defined constant.

15. The payment card as claimed in claim 11, wherein for executing the code to set the value of the counter, the payment card is further caused at least in part to:

set a value comprising an amount limit, wherein the amount limit corresponds to an allowable amount for the payment transactions using the payment card.

16. The payment card as claimed in claim 15, wherein the amount limit is updated each time the payment card is utilized to make the payment transaction.

17. A non-transitory computer readable storage media of a payment card having instructions stored thereon that when executed by a processing system of the payment card, direct the processing system to at least:

receive, by the processing system of the payment card of the user, a command signal from a user device of a user, the command signal comprising a user identifier in an encrypted form and a code generated by the payment application to set a value of a counter stored in the payment card;

decrypt, by the processing system of the payment card of the user, the user identifier in the encrypted form using a security key stored in a security domain of the payment card for obtaining a decrypted user identifier;

match, by the processing system of the payment card of the user, the decrypted user identifier and a unique identifier, wherein the unique identifier is stored in the payment card during personalization of the payment card;

upon successful match, execute, by the processing system of the payment card of the user, the code to set the value of the counter; and for each payment transaction at a point of sale (POS) terminal of a merchant:

read, by the processing system of the payment card of the user and without any input from an issuer of the payment card, the value of the counter;

when the value of the counter is not equal to a threshold value, exchange, by the processing system of the payment card of the user and without any input from the issuer of the payment card, data with the POS terminal of the merchant that is required by the POS terminal to conduct a payment transaction;

update, by the processing system of the payment card of the user and without any input from the issuer of the payment card, a current value of the counter by a pre-defined value each time the payment card is successfully used to make a payment transaction at the POS terminal of the merchant for obtaining an updated value of the counter, and when the updated value of the counter is equal to the threshold value, preclude, by the processor and without any input from the issuer of the payment card, the payment card to be used for payment transactions.

\* \* \* \* \*